(12) United States Patent
Adams, Jr. et al.

(10) Patent No.: US 6,671,401 B1
(45) Date of Patent: Dec. 30, 2003

(54) REMOVING COLOR MOIRE PATTERNS FROM DIGITAL IMAGES HAVING KNOWN CHROMATICITIES

(75) Inventors: James E. Adams, Jr., Rochester, NY (US); John F. Hamilton, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/391,870

(22) Filed: Sep. 8, 1999

(51) Int. Cl.[7] .............................. G06K 9/00; H04N 1/46; H04N 1/40
(52) U.S. Cl. ..................... 382/162; 382/163; 382/167; 358/533; 358/454
(58) Field of Search .................... 358/1–9, 533–536, 358/454; 382/162, 163, 167, 237, 269; 348/241, 273

(56) References Cited

U.S. PATENT DOCUMENTS

| | | | | | |
|---|---|---|---|---|---|
| 3,971,065 | A | * | 7/1976 | Bayer ........................... | 358/533 |
| 4,716,455 | A | * | 12/1987 | Ozawa et al. ................ | 358/533 |
| 5,381,247 | A | * | 1/1995 | Hains .......................... | 358/533 |
| 6,100,929 | A | * | 8/2000 | Ikeda et al. .................. | 348/262 |
| 6,285,462 | B1 | * | 9/2001 | Balasubramanian et al. . | 358/1.9 |

* cited by examiner

Primary Examiner—Andrew W. Johns
Assistant Examiner—Amir Alavi
(74) Attorney, Agent, or Firm—Raymond L. Owens

(57) ABSTRACT

A method for removing color moire pattern noise having known chromaticities from a digital image is disclosed. The chromaticities are used to determine the region of color moire. The chromaticities within the region of color moire are then changed in accordance with the chromaticities of the located pixels in the region of color moire so that the color moire pattern noise is reduced.

6 Claims, 2 Drawing Sheets

REMOVING COLOR MOIRE PATTERNS FROM DIGITAL IMAGES HAVING KNOWN CHROMATICITIES

FIELD OF INVENTION

The present invention relates to providing digital images with reduced color moire patterns.

BACKGROUND OF THE INVENTION

One type of noise found in digital camera images appears as low frequency, highly colored patterns in regions of high spatial frequency, e.g., tweed patterns in clothing. These patterns, called color moire patterns or, simply, color moire, produce large, slowly varying colored wavy patterns in an otherwise spatially busy region. Color moire patterns are also referred to as chroma aliasing patterns, or, simply, chroma aliasing.

There are numerous ways in the prior art for reducing color moire patterns in digital images. Among these are numerous patents that describe color moire pattern reduction methods using optical blur filters in digital cameras to avoid aliasing induced color moire in the first place. However, these blur filters also blur genuine spatial detail in the image that may not be recoverable by subsequent image processing methods.

Some approaches deal specifically with digital image processing methods for reducing or removing chroma noise artifacts. One class of digital camera patents discloses improvements to the color filter array (CFA) interpolation operation to reduce or eliminate high frequency chroma noise artifacts. Another class of patents teach using different pixel shapes (i.e., rectangles instead of squares) and arrangements (e.g., each row is offset by half a pixel width from the preceding row) with accompanying CFA interpolation operations to reduce or eliminate chroma noise artifacts. However, these techniques address only high frequency chroma noise, and are generally ineffective against low frequency color moire.

There is the well known technique in the open literature of taking a digital image with chroma noise artifacts, converting the image to a luminance - chrominance space, such as CIELAB, blurring the chrominance channels and then converting the image back to the original color space. This operation is a standard technique used to combat chroma noise. One liability with this approach is that there is no discrimination during the blurring step between chroma noise artifacts and genuine chroma scene detail. Consequently, sharp colored edges in the image begin to bleed color as the blurring become more aggressive. Usually, the color bleed has become unacceptable before most of the low frequency color moire is removed from the image. Also, if any subsequent image processing is performed on the image, there is the possibility of amplifying the visibility of the color bleeding. A second liability of this approach is that a small, fixed blur kernel is almost required to try to contain the problem of color bleeding. However, to address low frequency color moire, large blur kernels would be needed to achieve the desired noise cleaning.

SUMMARY OF THE INVENTION

It is an object of the present invention to remove low frequency color moire from a digital image.

It is another object of the present invention to remove low frequency color moire from a digital image by using known chromaticities from the color digital image.

It is another object of this invention to provide an improved color moire cleaned digital image using known chromaticities from the color digital image.

These objects are achieved with a method of removing color moire pattern noise having known chromaticities from a color digital image comprising:

locating the pixels having the known chromaticities in the digital image to determine the region of color moire; and changing the chromaticities of the located pixels in accordance with the chromaticities of the located pixels in the region of color moire so that the color moire pattern noise is reduced.

The present invention overcomes the limitation of the "chroma blur trick" by first separating the regions of the image with color moire from the rest of the image. Color moire regions, alone, are then processed, leaving the rest of the image unaltered. Secondly, rather than performing a formal blur on chroma aliased data, resetting the chroma values to an appropriate value eliminate any migration of errors into adjacent pixels.

The features of this invention include:

1) automated operation (no user intervention is required, although the user could be given access to some algorithm parameters to control the aggressiveness of image modification), and 2) minimal computational load (convolution methods, the standard approach to this problem, are avoided).

A novel aspect of this invention is that it uses knowledge of the color filter array (CFA) spatial sampling characteristics to separate chroma aliasing from genuine scene information so that the former can be eliminated from the image.

DETAILED DESCRIPTION OF THE INVENTION

Since noise cleaning algorithms for digital images are well known, the present description will be directed in particular to elements forming part of, or cooperating more directly with, apparatus and method in accordance with the present invention. Elements not specifically shown or described herein may be selected from those known in the art. Although the present invention will be described in relation to a digital image produced by an electronic camera, it will be understood by those skilled in the art that the present invention is not limited to such image product devices and can use original digital images from other sources.

Figure 1:
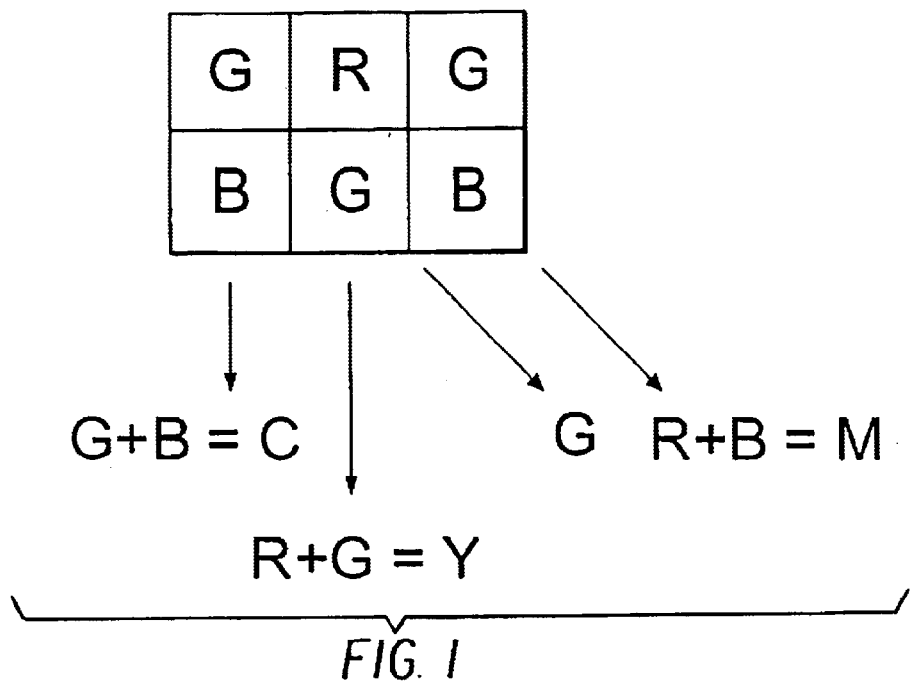
FIG. 1 is an illustration of color moire patterns caused by a Bayer array in which unique chromaticities are created.

Referring to FIG. 1, a digital camera image captured with a Bayer CFA pattern will produce color moire patterns with four specific colors. The Bayer array is disclosed in commonly assigned U.S. Pat. No. 3,971,065 and uses red, green and blue pixels with a repeating pixel kernel

GR

BG wherein G is green, R is red, and B is blue. In the figure, R is red, G is green, B is blue, C is cyan, M is magenta, and Y is yellow. Although the Bayer array is preferred, other patterns with repeating color kernel pixels can also be used in accordance with the present invention. Moreover, different filters other than red, green, and blue such as cyan, magenta and yellow. Aliasing at 45 degrees will create either a green pattern or a magenta pattern (red plus blue). Aliasing along the axes will create either cyan (green plus blue) or yellow (red plus green) patterns. These aliasing colors tend to be saturated and, as a result, relatively easy to separate from genuine scene colors.

Figure 2:
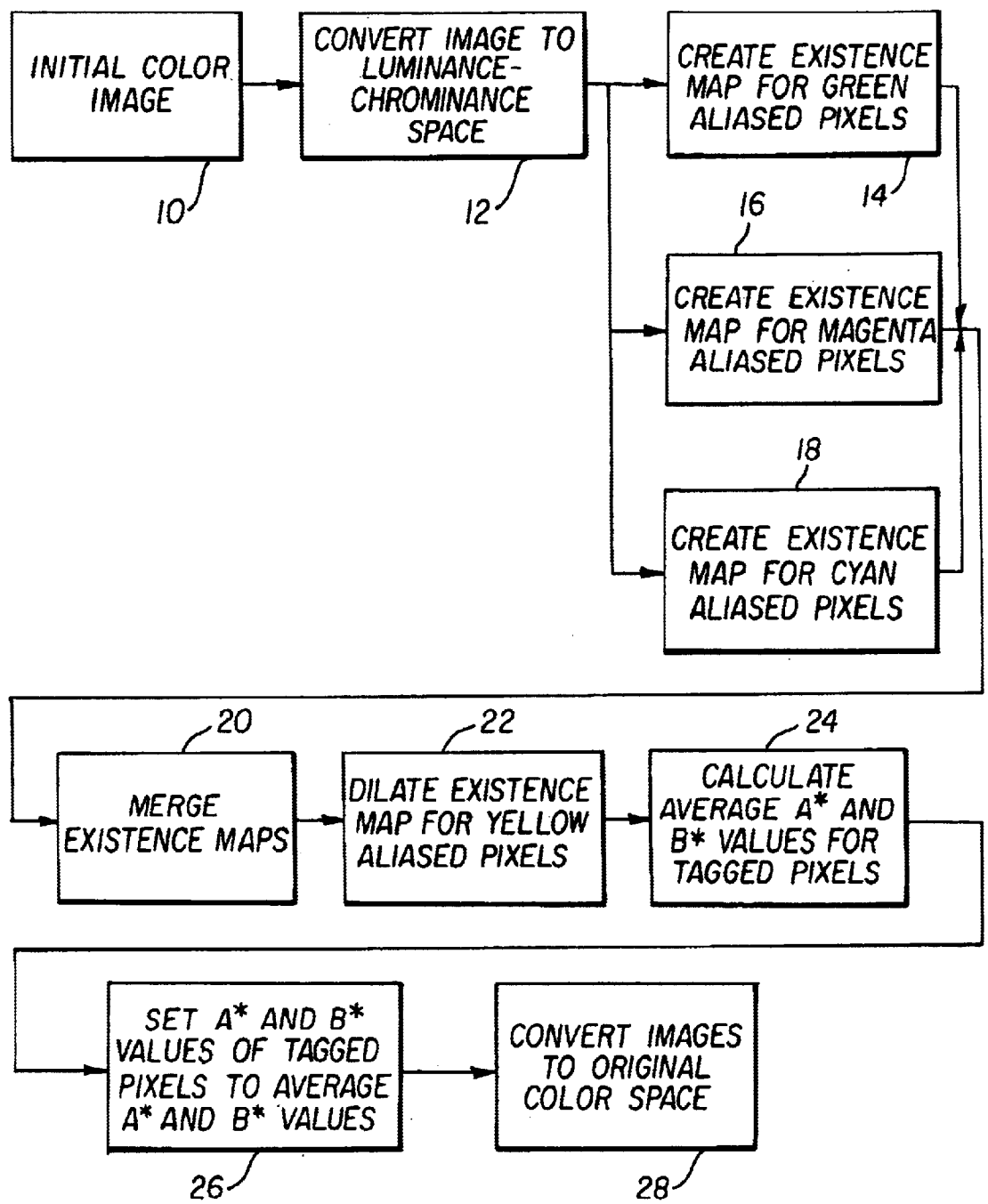
FIG. 2 is a block diagram of the processing flow for practicing the present invention to produce improved digital images.

Referring to FIG. 2, block 10 represents the initial image, which has unwanted chroma aliasing, or moire patterns. In block 12, the image is converted to a luminance—chrominance space, such as CIELAB. Although the CIELAB color space is preferred, other color spaces that can be used in accordance with the present invention will suggest themselves to those skilled in the art. Other luminance—chrominance spaces, such as CIELUV and $YC_RC_B$, could be used, as well. At this point, inspection of the converted image shows that the chroma aliasing exists primarily in the chrominance (a* and b*) planes and not in the luminance (L*) plane. In addition, the chroma aliasing patterns includes four colors: green, magenta, cyan, and yellow. In block 14, an existence map is created identifying the pixel locations of green chroma aliasing patterns. This is done by simply comparing the L*, a*, and b* values of each pixel and seeing if they are within range of the aliasing green color created by the Bayer pattern. Blocks 16 and 18 create the same types of existence maps for magenta and cyan aliasing colors, accordingly. In block 20, the existence maps created in blocks 14, 16, and 18 are merged into a single existence map. This merging is accomplished by performing a mathematical OR operation of the three individual existence maps. Next, the yellow chroma aliasing patterns are identified. A problem with the yellow patterns is that the yellow can be very close to skin tone colors, making a simple, color based separation difficult. However, wavy gaps in the existence map indicate the location of these yellow chroma aliasing patterns. So, in block 22, a simple dilate operation on the existence map to fill in these wavy gaps properly identifies the yellow chroma aliasing patterns without selecting larger and more regularly shaped skin tone regions. At the conclusion of block 22, the existence map locates (identifies) pixels in the region of color moire in the image. In block 24, the a* and b* values of each pixel tagged by the existence map are averaged to get a global mean value for a* and b* for the chroma aliased pixels. Block 24 can be viewed as a very large blur kernel operation. In block 26, the a* and b* values of each of the tagged pixels are set equal to the global mean a* and b* values calculated in block 24. This operation eliminates the chroma aliasing patterns. In block 28, the processed image is converted back to the original color space.

Figure 3:
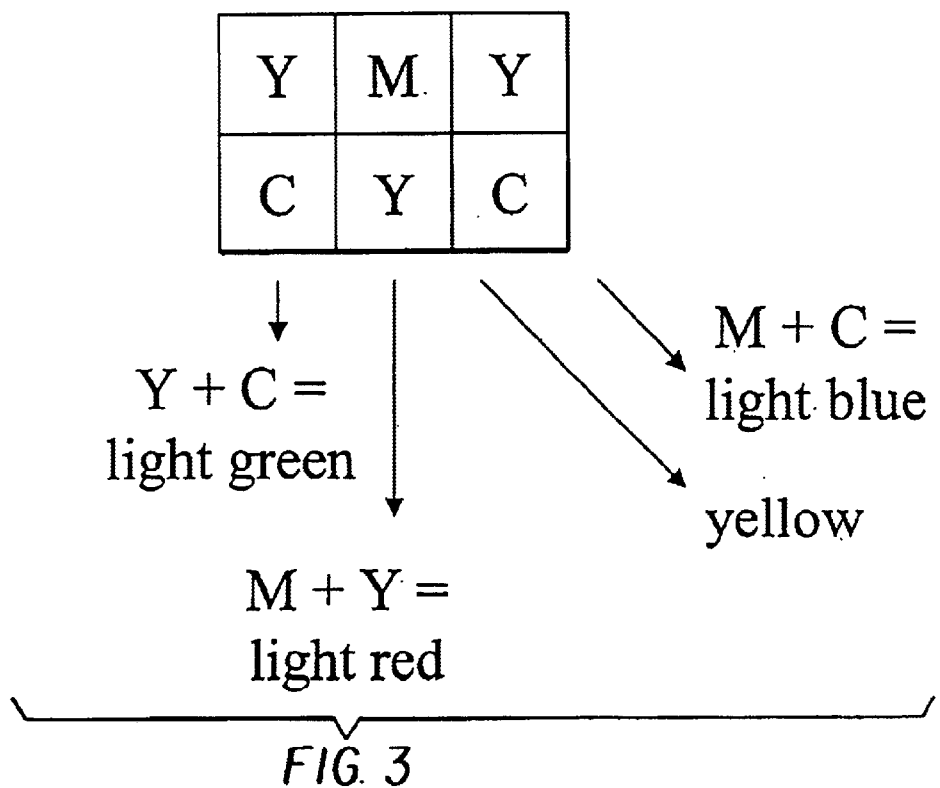
FIG. 3 is an illustration similar to FIG. 1 of color moire patterns caused by another color filter array in which unique chromaticities are created.

Although the present invention has been described using a standard Bayer array, another color filter array having the following repeating kernel:

YM
CY wherein Y is yellow, M is magenta, and C is cyan is particularly suitable for use with the present invention. When using this kernel the pixels having the known chromaticities of yellow, light blue, light green, and light red caused by the repeating kernel in the digital image to determine the region of color moire (See FIG. 3). By changing the chromaticities of the located pixels in accordance with the chromaticities of the located pixels in the region of color moire so that the color moire pattern noise is reduced.

The present invention can be embodied in a software program provided in a computer program product, having a computer readable storage medium having a computer program stored thereon removing color moire pattern noise having known chromaticities from a color digital image. The computer program performs the steps of:

a) locating the pixels having the known chromaticities in the digital image to determine the region of color moire; and b) changing the chromaticities of the located pixels in accordance with the chromaticities of the located pixels in the region of color moire so that the color moire pattern noise is reduced.

The computer readable storage medium may comprise, for example, magnetic storage media, such as magnetic disks (such as a floppy disk) or magnetic tape; optical storage media such as an optical disk, optical tape or machine readable memory (RAM), or read only memory (ROM); or any other physical device or medium.

The invention has been described in detail with particular reference to certain preferred embodiments thereof, but it will be understood that variations and modifications can be effected within the spirit and scope of the invention.

| PARTS LIST | |
|---|---|
| 10 | original image |
| 12 | color space conversion block |
| 14 | green pixel existence map creation block |
| 16 | magenta pixel existence map creation block |
| 18 | cyan pixel existence map creation block |
| 20 | merged existence map creation block |
| 22 | existence map dilation block |
| 24 | chrominance averaging block |
| 26 | chrominance replacement block |
| 28 | color space conversion block |

What is claimed is:

1. A method of removing color moire pattern noise having known chromaticities from a color digital image, comprising:

locating pixels having the known chromaticities in the digital image to determine the region of color moire; and changing the chromaticities of the located pixels in accordance with the chromaticities of the located pixels in the region of color moire thereby changing colorimetric colors of the located pixels so that the color moire pattern noise is reduced.

2. A method of claim 1, wherein the chromaticities of the located pixels are changed by averaging the chromaticities of the located pixels.

3. A method of removing color moire pattern noise having known chromaticities from a color digital image taken by an image sensor having the following repeating kernel:

GR
BG wherein G is green, R is red, and B is blue, comprising:

locating pixels having the known chromaticities of green, magenta, cyan, and yellow caused by the repeating kernel in the digital image to determine the region of color moire; and changing the chromaticities of the located pixels in accordance with the chromaticities of the located pixels in the region of color moire thereby changing colorimetric colors of the located pixels so that the color moire pattern noise is reduced.

4. A method of removing color moire pattern noise having known chromaticities from a color digital image taken by an image sensor having the following repeating kernel:

YM

CY ps wherein Y is yellow, M is magenta, and C is cyan, comprising:

locating pixels having the known chromaticities of yellow, light blue, light green, and light red caused by the repeating kernel in the digital image to determine the region of color moire; and changing the chromaticities of the located pixels in accordance with the chromaticities of the located pixels in the region of color moire thereby changing colorimetric colors of the located pixels so that the color moire pattern noise is reduced.

5. A computer program product, comprising a computer readable storage medium having a computer program stored thereon for removing color moire pattern noise having known chromaticities from a color digital image for performing:

locating pixels having the known chromaticities in the digital image to determine the region of color moire; and changing the chromaticities of the located pixels in accordance with the chromaticities of the located pixels in the region of color moire thereby changing colorimetric colors of the located pixels so that the color moire pattern noise is reduced.

6. A method of reducing color moire pattern noise, comprising:

locating a region of color moire in a digital image; and changing the chromaticities of pixels in the region of color moire thereby changing colorimetric colors of the pixels so that the color moire pattern noise is reduced.

* * * * *